United States Patent
Francois et al.

(10) Patent No.: US 8,811,498 B2
(45) Date of Patent: Aug. 19, 2014

(54) METHOD AND DEVICE FOR COMPRESSING VIDEO-PACKET CODED VIDEO DATA

(75) Inventors: Edouard Francois, Bourg des Comptes (FR); Dominique Thoreau, Cesson Sevigne (FR); Jean Kypreos, Betton (FR); Philippe Guillotel, Vern sur Seiche (FR); Philippe Bordes, Laille (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 2820 days.

(21) Appl. No.: 10/499,278

(22) PCT Filed: Dec. 17, 2002

(86) PCT No.: PCT/FR02/04377
§ 371 (c)(1),
(2), (4) Date: Dec. 1, 2004

(87) PCT Pub. No.: WO03/053065
PCT Pub. Date: Jun. 26, 2003

(65) Prior Publication Data
US 2005/0069040 A1    Mar. 31, 2005

(30) Foreign Application Priority Data
Dec. 19, 2001    (FR) ..................... 01 16467

(51) Int. Cl.
*H04N 7/12*    (2006.01)

(52) U.S. Cl.
USPC ............. 375/240.27; 375/240.12; 375/240.26

(58) Field of Classification Search
USPC ...................................... 375/240.27
See application file for complete search history.

(56) References Cited

U.S. PATENT DOCUMENTS

| | | | |
|---|---|---|---|
| 5,991,445 A | 11/1999 | Kato | |
| 6,385,251 B1 * | 5/2002 | Talluri et al. | 375/240.27 |
| 6,493,392 B1 * | 12/2002 | Moon et al. | 375/240.27 |
| 6,990,151 B2 * | 1/2006 | Kim et al. | 375/240.27 |
| 7,131,048 B2 * | 10/2006 | Suzuki et al. | 714/748 |
| 7,327,790 B1 * | 2/2008 | Bretl et al. | 375/240.26 |
| 2003/0014705 A1 * | 1/2003 | Suzuki et al. | 714/748 |
| 2005/0254584 A1 * | 11/2005 | Kim et al. | 375/240.27 |

FOREIGN PATENT DOCUMENTS

| | | | |
|---|---|---|---|
| EP | 820198 | 1/1998 | |
| EP | 820198 A2 * | 1/1998 | H04N 7/26 |

OTHER PUBLICATIONS

Search Report Dated Jun. 2, 2003.

* cited by examiner

*Primary Examiner* — Jessica M Roberts
(74) *Attorney, Agent, or Firm* — Tutunjian & Bitetto, P.C.

(57) ABSTRACT

A method for compressing video operates by first deleting one or more video packets from binary train to provide a reduced binary train. Thereafter, error masking is performed on the reduced binary train to yield a corrected degraded local decoded image which is the image reconstructed on the basis of the reduced binary train and of the masking algorithm. The reduction in the binary train is validated as a function of the quality of the corrected degraded local decoded image. Lastly one of the reduced binary train or of the binary train, is selected depending on whether or not there is validation.

9 Claims, 2 Drawing Sheets

METHOD AND DEVICE FOR COMPRESSING VIDEO-PACKET CODED VIDEO DATA

This application claims the benefit, under 35 U.S.C. §365 of International Application PCT/FR02/04377, filed Dec. 17, 2002, which was published in accordance with PCT Article 21(2) on Jun. 26, 2003 in French and which claims the benefit of French patent application No. 0116467, filed Dec. 17, 2002.

FIELD OF THE INVENTION

The invention relates to a method and device for compressing video data coded by video packets. It lies within the field of video compression implementing techniques of robustness to errors and based on the use of video packets. In particular, applications may be envisaged within the context of the H.263, MPEG-2 and MPEG-4 standards which integrate such tools.

BACKGROUND OF THE INVENTION

The video packets consist in the generation, during the coding of each image of the video, of binary data that are spatially independent of one another. The binary train of an image consists of several packets, isolated from one another by resynchronization markers. Each packet can be tagged by the synchronization marker which precedes it. It can be decoded without knowing the data of the neighbouring packets. This tool ensures more robustness to decoding in the event of loss of packets since these losses do not give rise to spatial propagation of errors.

The cost of compression of the video data is generally dependent on the quality of the image desired on reception. This relation is known and depends mainly on the value of the quantization interval of the DCT coefficients. Conventionally, compression is improved by implementing effective coding strategies utilizing all the options offered by the coding scheme. These strategies relate essentially to the following two points:

choice of the modes of image coding, macroblock and block, ensuring a satisfactory compromise between coding quality and coding cost in these modes;

for the temporally predicted images, choice of the motion vectors ensuring a satisfactory compromise between quality of the temporal prediction and cost of coding of the vectors.

Although these coding procedures, in general defined in the standards, are very effective, it is beneficial to implement additional means of reducing coding cost, the costs of transmission or of bandwidth remaining a major problem. It is in fact a matter of finding a compromise between the conventional compression procedures such as increasing the quantization interval and new procedures, to obtain a better image quality/coding cost ratio.

SUMMARY OF THE INVENTION

An aim of the invention is to alleviate the aforesaid drawbacks.

Its subject is a method for compressing video data, the compressed data being intended to be decoded with implementation of an error masking algorithm, comprising a step of coding the video data providing a binary train of data arranged in packets, characterized in that it also comprises:

a step of reducing the binary train consisting in deleting one or more video packets from the binary train so as to provide a reduced binary train, a step of implementing an error masking algorithm on the reduced binary train so as to calculate a corrected degraded local decoded image which is the image reconstructed on the basis of the reduced binary train and of the masking algorithm, a step of validation for validating or not the reduction in the binary train as a function of the quality of the corrected degraded local decoded image, a step of selection of the reduced binary train or of the binary train, depending on whether or not there is validation.

A particular embodiment, the method utilizing the temporal prediction on the basis of a preceding image called the reference image, consists of an additional step of storage of the corrected degraded local decoded image so as to be utilized as reference image during the coding of a next image.

A particular embodiment consists in the masking algorithm for the compression of the data being the same as that used for the decoding of the compressed data.

A particular embodiment calculates the quality of the image on the basis of the signal-to-noise ratio or PSNR of this image relative to the source image.

According to another embodiment, the quality of the corrected degraded local decoded is compared with the quality of the local decoded during the validation step.

According to another embodiment, the choice of a packet to be removed from the data stream is performed as a function of the quality of the corrected local decoded image obtained on the basis of the reduced binary train.

According to another embodiment, the selection of the binary train data relating to an image is done by successive iterations of the steps of reduction, validation and selection, packet by packet or group of packets by group of packets, the reduction in the binary train and its validation being performed on the binary train selected at the previous iteration.

The invention also relates to a video data coder, the coded data being intended to be decoded with implementation of an error masking algorithm, comprising a circuit for coding the video data providing a binary train of data arranged in packets, characterized in that it also comprises, a circuit for reducing the binary train carrying out the deletion of one or more video packets, a circuit for implementing an error masking algorithm on the reduced binary train so as to calculate a corrected degraded local decoded image which is the image reconstructed on the basis of the reduced binary train, a circuit for validating the reduction in the binary train as a function of the quality of the corrected degraded local decoded, a circuit for selecting the reduced binary train or the binary train, depending on whether or not there is validation.

The invention also relates to a coding/decoding system comprising the above coder and a decoder, characterized in that the coder implements the same error masking algorithm as that utilized by the decoder.

The approach proposed in the invention is aimed at reducing the cost of compression in the case where coding by video packets is utilized. It makes it possible to reduce the coding cost while degrading the quality of the image to a lesser extent. To do this, the error masking strategies implemented at the decoder are taken into account to improve the compression at the coder level: generation of the data that can be effectively reconstructed at the decoder is avoided, or else the video packets that it will be possible to reconstruct satisfactorily at the decoder are removed by utilizing these error masking algorithms. This solution is therefore particularly effective, in terms of quality, if the coder knows and adopts the same error masking strategies as the decoder. A "compatible" decoder such as this will then be capable of reconstructing the missing data exactly in the same way as done by the coder, and will therefore obtain at output a decoded image identical to that generated by the coder. A "noncompatible" decoder, utilizing another masking algorithm, will obtain a slightly different image and a drift may appear over time in the event of the implementation of temporal prediction in the coding scheme.

BRIEF DESCRIPTION OF THE DRAWINGS

Other features and advantages of the invention will become clearly apparent in the following description given by way of nonlimiting example and offered with regard to the appended figures which represent.

DETAILED DESCRIPTION OF PREFERRED EMBODIMENTS

Figure 1:
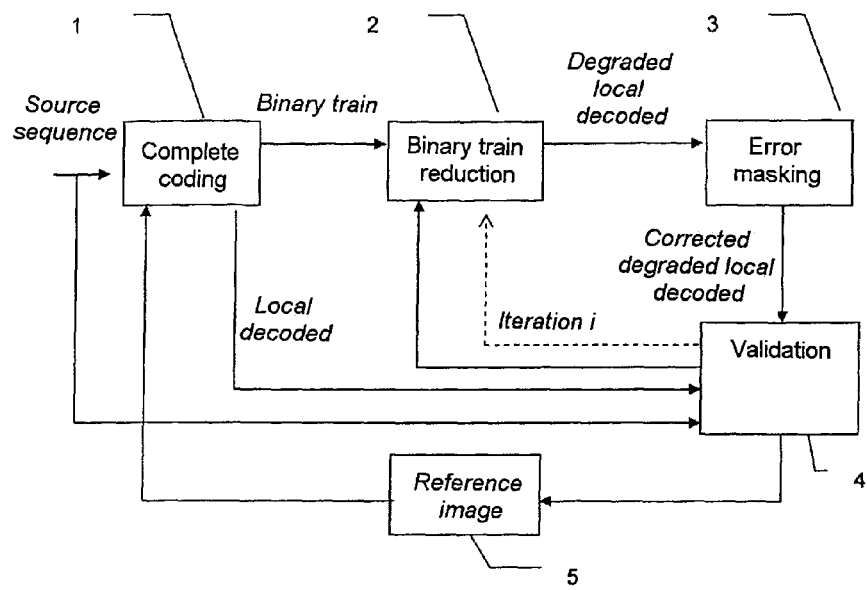
FIG. 1, a schematic of the method.

FIG. 1 represents a schematic of a coding method according to the invention.

The source sequence which is transmitted to the input of the coding device implementing the method is processed during a first step 1 which carries out a complete coding of the image in a conventional manner. This coding step delivers at its output a coded binary train which is transmitted to the next step 2, which binary train is composed of video packets defined by synchronization markers. It also delivers, to this step 2 and to a step 4, the local decoded image. This image is, in a known manner, reconstructed during the coding step 1, on the basis of the coded data. It is utilized during the coding, as reference image, for the modes of coding using temporal prediction, for example of inter-image type.

The role of step 2 is to delete video packets from the data stream and to calculate the corresponding image. This image, called the degraded local decoded, is obtained on the basis of the local decoded, from which the macroblocks corresponding to one or several video packets will have been deleted. This step 2 calculates the degraded local decoded image as well as the coded data to be transmitted. These data are dependent on a validation signal. This involves either the binary train received from step 1 if the deletion of video packets is not validated, or the reduced binary train if the deletion is validated.

The degraded local decoded is then processed, in the next step 3, utilizing an error masking algorithm to obtain a corrected degraded local decoded image which is an image reconstructed on the basis of the degraded image and of the error masking algorithm. An aim of this type of algorithm is to calculate data as replacement for missing or erroneous data, for example during transmission, in such a way as to limit the degradation of the image. This step also stores this image or several previous images as a function of the masking algorithm if it calls upon inter-image temporal correlation.

The next step 4 is a step of validation of the reduction of the binary train. On a first input it receives the corrected local degraded decoded image, on a second input it receives the local decoded image originating from the coding step 1 and finally, on a third input, it receives the source image of the source sequence. The image output from this step depends on the result of the validation. If the reduction of the binary train is validated, the image taken as reference image for the coding of the next image, in step 1, is the corrected local decoded image. In case of invalidation, it is the local decoded image calculated in step 1 which is taken as reference image. A validation signal is transmitted to step 2 for the choice of the coded data to be transmitted. In case of validation, the resulting binary train is the reduced binary train (that is to say stripped of the video packet whose removal has just been validated). In case of nonvalidation, the video packet is not removed and the binary train is preserved intact.

Figure 2:
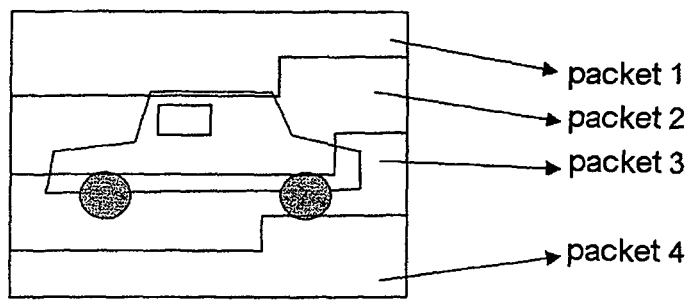
FIG. 2, a chopping into packets of the image to be coded.

For each image of the video sequence to be coded, a "complete" coding is firstly performed in step 1. This coding delivers a binary data train composed of video packets, which completely describe the image. For example, in the case where the MPEG-4 video standard is utilized, packet No 1 describes macroblocks 1 to $N_1$, packet No 2 describes macroblocks $N_1+1$ to $N_2$, packet No 3 describes macroblocks $N_2+1$ to $N_3$, etc. All the macroblocks of the image can be reconstructed on the basis of these video packets. FIG. 2 shows such a chopping of the image into 4 video packets.

Figure 3:
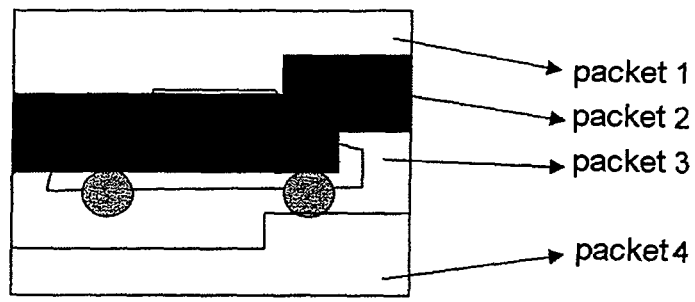
FIG. 3, the removal of a video packet from the coded image.

Step 2 of reducing the binary train is aimed at reducing the quantity of binary data emanating from the coding, that is to say at increasing the data compression or reducing the coding cost. It consists in removing one or more video packets from the binary data stream. The criterion for selecting the video packets to be removed is strongly dependent on the error masking strategies adopted. In a general manner, the error masking algorithms that afford the greatest effectiveness essentially utilize temporal masking, which consists in searching for the missing information in the previous images, in the sense of the motion. Thus, this step selects by priority the video packets whose data are essentially coded in INTER mode, with a low prediction residual. Again taking the example of FIG. 2, FIG. 3 illustrates the result of the removal of a video packet on the decoded image. The black zone corresponds to the lost data. The degraded local decoded image is constructed on the basis of the local decoded image received, from which the blocks corresponding to one or more packets are deleted.

Figure 4:
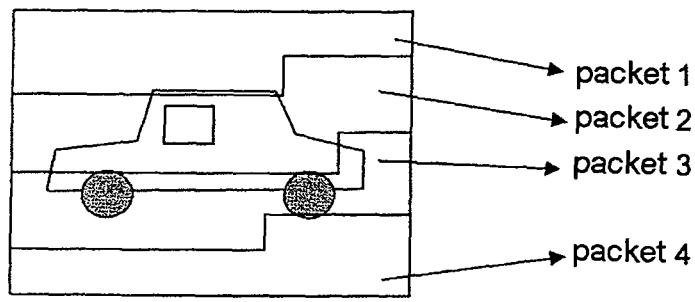
FIG. 4, a decoded image after error masking.

The next step 3 implements an error masking algorithm. The video packets that have been removed from the binary train will generate errors at the decoder, corresponding in fact to image zones for which there is no longer any information to be decoded. The decoder will therefore use error masking algorithms to fill in these empty zones. The approach proposed consists in applying the same algorithms at the coder level to the zones corresponding to the video packets previously removed. FIG. 4 shows the effect of masking in the example of the car. If the masking reconstructs the missing signal, it nevertheless does so with errors. The dimensions of the window show for example that the masking is not perfect.

Step 4 has the aim of validating the binary train reduction performed. This involves verifying that the removal of one or more video packets, followed by masking of the errors generated, does not cause too significant a degradation of the resulting image with respect to the image emanating from the complete coding. The processing therefore consists in comparing the quality of the image emanating from the complete coding, dubbed the local decoded or reconstructed image, with that of the image emanating from the reduction of the binary train and from the error masking, dubbed the corrected degraded local decoded or corrected image, using the source image as reference. A measure of quality may, in a conventional manner, be the signal-to-noise ratio or PSNR, the acronym standing for Peak Signal to Noise Ratio.

The decision test is for example:
    If PSNR(corrected image)≥PSNR(reconstructed image)−λ
then the reduction is validated, and the selected video packets are actually removed from the binary train.

λ is a threshold that can depend on the source image. It is for example a function of the complexity of the zones corresponding to the packets removed and represents the tolerance in the degradation of the image.

The PSNR of an image I is defined by the relation:

$$PSNR = -10 \text{Log}\left(\sum_{i,j=1,1}^{i,j=l,c}(I(i,j) - I_{src}(i,j))^2\right)1Lc$$

where i, j are the coordinates of the pixel in the image I, l and c correspond to the number of rows and of columns of pixels in the image I, I(i, j) corresponds to the luminance value of the pixel with coordinates (i, j) in the image I and $I_{src}$(i, j) corresponds to the luminance value of the pixel with coordinates (i, j) in the source image.

The decision can also incorporate time-coherence measures, aimed at limiting temporal fluctuations and at avoiding the removal of one and the same set of macroblocks in several successive images, which could generate an increasing degradation in the quality of the resulting images.

Depending on the decision taken, it is the reconstructed image or the corrected image that will serve as reference image for the coding of the subsequent images of the video sequence, in the case of temporal predictive coding. Drifting at the decoder level during temporal prediction is thus avoided. The decoder, using the same error masking strategies as the coder, will be furnished with the same reference image as the coder.

A variant of the invention consists in not now determining whether or not a video packet is removed but rather which packets are those that one wishes to remove from the binary stream, as a function of the errors generated in the corrected image. A first packet is removed from the data stream and a test of quality of the corresponding corrected degraded local decoded image is performed. A second packet is removed in place of the first and a new test is performed. So on and so forth for all the packets relating to an image. During a second pass, the packet for which the corrected degraded local decoded image is of best quality is actually removed from the data stream.

These same tests on the quality of the corrected degraded local decoded image may also be performed to decide the number of packets of an image that can be removed, by calculating the corrected degraded local decoded image after successive removal of one, two, three packets etc. until the quality of this image is no longer suitable. The order of choice of the packets, for the test, can be dependent on the quality of the corrected degraded image obtained during the unitary removal of each packet, as indicated previously.

These variants are symbolized in FIG. 1 by the dashed line connecting step 4 to step 2. A validation, that is to say a test of quality, is performed after each removal of a packet from the binary stream.

Another variant consists in incorporating into the conventional decision algorithm of the coder, step 1, the option of data removal and the error masking strategies. The main difference as compared with the previous solutions is that the choice of data removal is incorporated into the coding module. The approach consists in adding a mode of coding called the "macroblock masking" mode to the decision algorithm of the coder. It is added to the conventional modes of coding such as the intra, forward predictive, backward predictive modes, etc. Hence, one calculates, in addition to all the other modes proposed, for each macroblock, its representation after masking, as would be done at the decoder by the implementation of the error masking algorithm. This masking algorithm makes it possible to obtain a new macroblock. A quality criterion is calculated on the basis of this new macroblock, for example on the basis of the PSNR. The decision criterion comprises two terms, a term relating to the coding cost, which is zero for this "macroblock masking" mode, and a term relating to the quality of coding, which is this quality criterion. These two terms are evaluated to determine the choice of coding. The phenomenon of drift is here also avoided since the prediction image used later on in the coding takes account of this new mode.

The decision of the mode of coding by macroblock masking may be tied to an additional constraint: that the entire set of macroblocks of a packet or a minimum percentage of the macroblocks of the packet can be coded in this mode. A first pass over the entire set of macroblocks of a packet is then performed to decide on this coding by macroblock masking for the entire set of macroblocks of the packet.

The applications of the invention relate, inter alia to the compression of data for the transmission or storage of digital images packetwise.

The invention claimed is:

1. Method for compressing video data intended for transmission as a binary train, to a decoder, comprising the steps of:
    receiving a source sequence in a coding device;
    coding the video data received in the coding device to provide a first binary train of data arranged in video packets;
    reducing the first binary train by deleting at least one video packet from said first binary train to get a second binary train having a reduced number of video packets;
    implementing error masking on the second binary train to provide a corrected degraded local decoded image which is the image reconstructed on the basis of the second binary train and error masking, wherein error masking is implemented on the decoder side to mask packet errors due to transmission;
    validating the second binary train as a function of the quality of the corrected degraded local decoded image; and
    selecting the second binary train or the first binary train, depending on whether or not there is validation, as the transmitted binary train.

2. Method according to claim 1 further comprising the steps of:
    utilizing temporal prediction based on a preceding image called the reference image; and
    storing the corrected degraded local decoded image for use as reference image during the coding of the next image.

3. Method according to claim 1, wherein the quality of the image is calculated on the basis of the signal-to-noise ratio (PSNR) of this image relative to the source image.

4. Method according to claim 1, wherein, during the validation step, the quality of the corrected degraded local decoded image is compared with the quality of the local decoded image.

5. Method according to claim 1, wherein the choice of a packet to be removed from the data stream is made as a function of the quality of the corrected local decoded image obtained on the basis of the reduced binary train.

6. Method according to claim 1, wherein the selection of the binary train data relating to an image is done by successive iterations of the steps of reduction, validation and selection, packet by packet or group of packets by group of packets, the reduction in the binary train and its validation being performed on the binary train selected at the previous iteration.

7. Method for coding according to claim 1, wherein MPEG type coding is implemented.

8. Video data coder for coding data intended for transmission as a binary train, to a decoder, comprising:
   a first circuit for coding the video data to provide a first binary train of data arranged in video packets;
   a second circuit for reducing the first binary train by carrying out deletion of at least one video packet, to provide a second binary train having a reduced number of video packets;
   a third circuit for implementing error masking on the second binary train to provide a corrected degraded local decoded image which is the image reconstructed on the basis of the second binary train, error masking being implemented on the decoder side to mask packet errors due to transmission,
   a fourth circuit for validating the second binary train as a function of the quality of the corrected degraded local decoded image; and
   a fifth circuit for selecting the second binary train or the first binary train, depending on whether or not there is a validation, as the transmitted binary train.

9. Coding/decoding system comprising a coder according to claim 8 and a decoder, wherein the coder implements the same error masking as that utilized by the decoder.

* * * * *